(12) United States Patent
Matsushita et al.

(10) Patent No.: US 6,751,378 B2
(45) Date of Patent: Jun. 15, 2004

(54) SLEEVE AND A MANUFACTURING METHOD THEREOF

(75) Inventors: Junichi Matsushita, Shizuoka (JP); Naoshi Serizawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 87 days.

(21) Appl. No.: 09/893,548

(22) Filed: Jun. 29, 2001

(65) Prior Publication Data

US 2001/0051027 A1 Dec. 13, 2001

(30) Foreign Application Priority Data

Jul. 4, 2000 (JP) ........................................ 2000-202163

(51) Int. Cl.[7] ................................................ G02B 6/32
(52) U.S. Cl. .............................. 385/34; 385/79; 385/31; 385/43; 385/76
(58) Field of Search ............................ 385/79, 31, 33, 385/38, 43, 50, 76, 77, 126, 121, 88

(56) References Cited

U.S. PATENT DOCUMENTS 5,136,676 A * 8/1992 Arnett et al. ................. 385/119
5,832,151 A * 11/1998 Riser et al. ..................... 385/31
6,428,216 B1 * 8/2002 Savage, Jr. ..................... 385/88

FOREIGN PATENT DOCUMENTS

JP 6-33443 8/1994
JP 2000-304980 11/2000

* cited by examiner

*Primary Examiner*—Drew Dunn
*Assistant Examiner*—Joshua L. Pritchett
(74) *Attorney, Agent, or Firm*—Armstrong, Kratz, Quintos, Hanson & Brooks, LLP

(57) ABSTRACT

A sleeve for an optical connector and a method of manufacturing the sleeve is provided. The sleeve is put between an optical fiber 6 and a transmitting module 4b or between an optical fiber 6 and a receiving module 4a so as to optically connect the optical fiber 6 and the transmitting or receiving module. The sleeve 1 integrally has a light-leading path 26 in a flat-headed conic shape, a peripheral projecting portion 27, an outer tube portion 28. A small-diameter end face 29 of the light-leading path 26 of the sleeve 1 faces the transmitting device 4b or the receiving device 4a. The peripheral projecting portion 27 projects from a peripheral surface of the other end portion 30, on a side of a larger diameter, of the light-leading path 26. The outer tube portion 28 is cylindrically formed and extends from a peripheral portion of the peripheral projecting portion 27. The outer tube portion 28 extends over an entire length of the light-leading path 26 along an optical axis P.

9 Claims, 6 Drawing Sheets

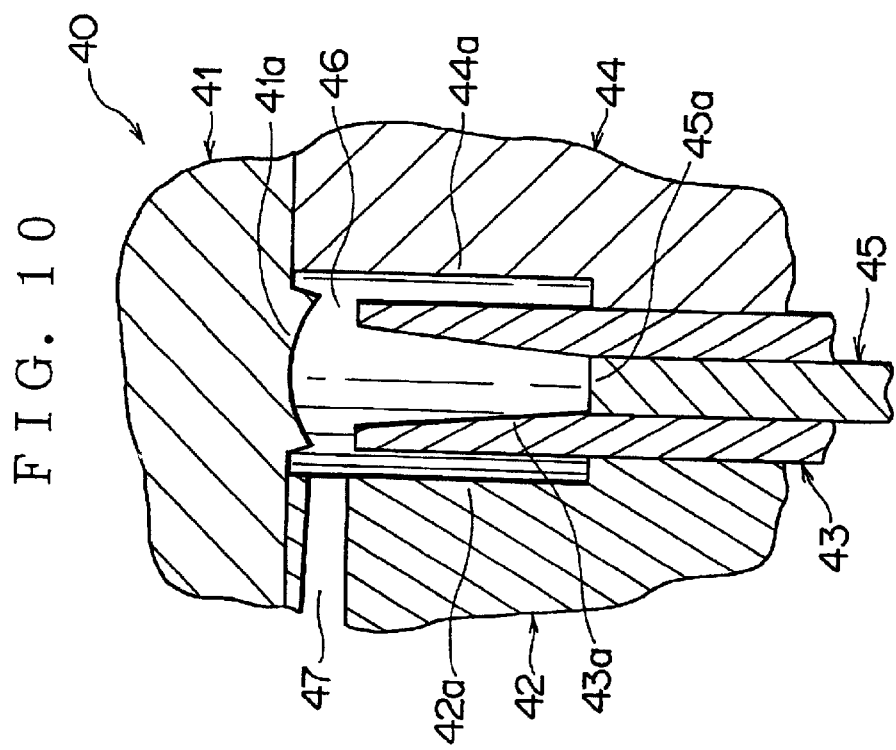
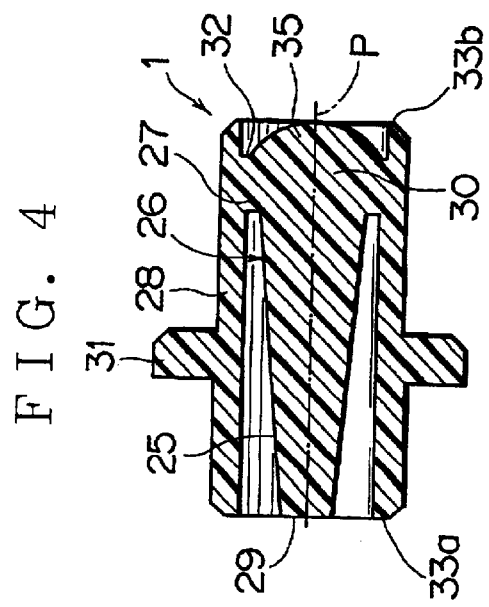
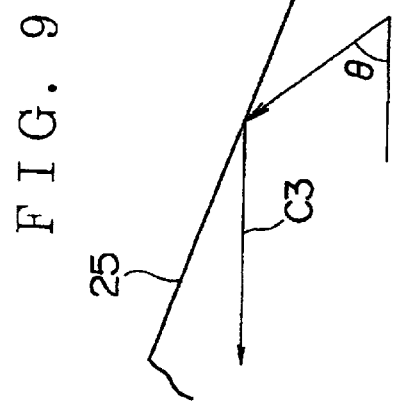

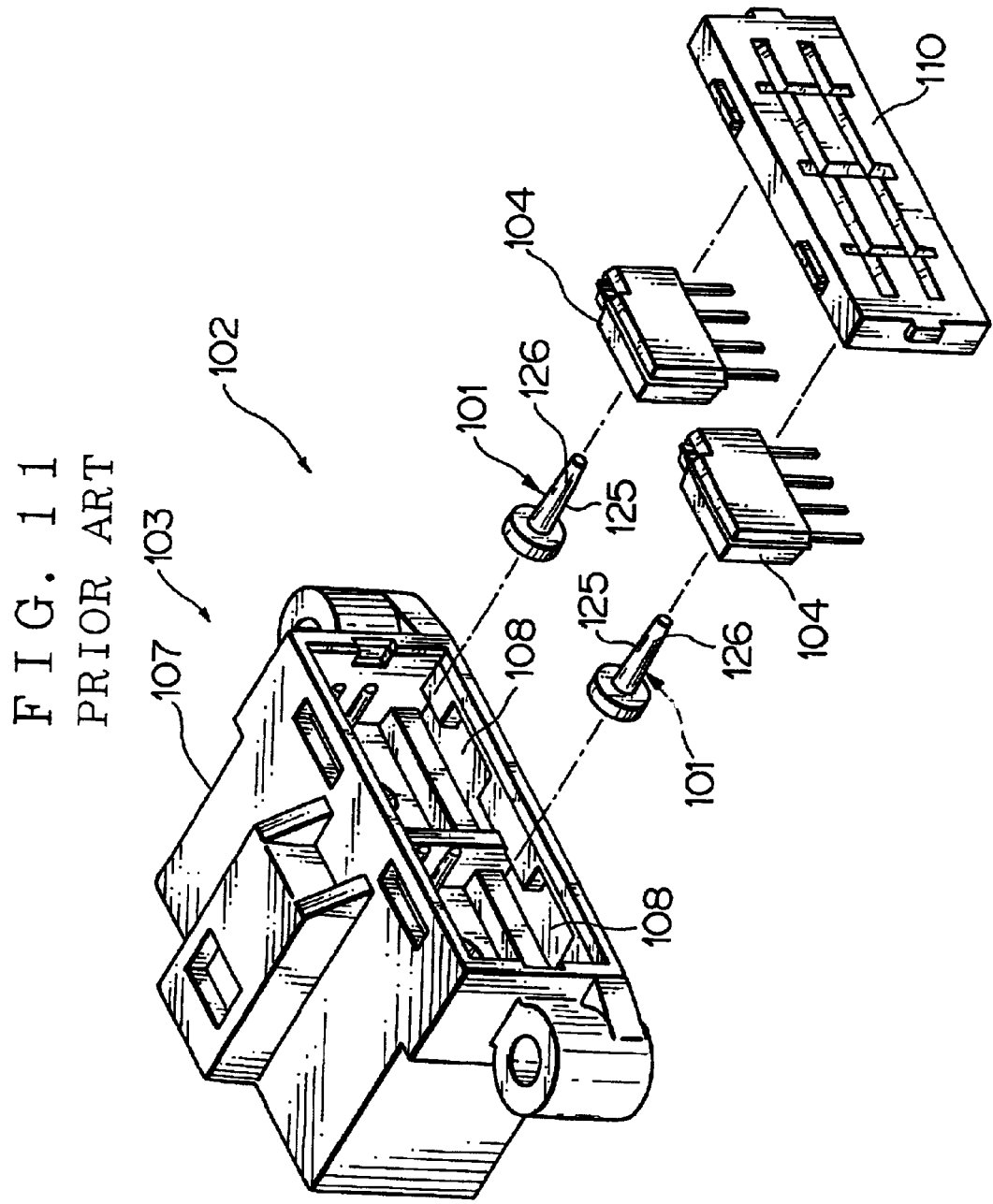

SLEEVE AND A MANUFACTURING METHOD THEREOF

BACKGROUND OF THE INVENTION

1. Field of the Invention

The present invention relates to a sleeve and an optical connector having the sleeve, which sleeve is put between an optical fiber and a transmitting module or between an optical fiber and a receiving module so as to optically connect the optical fiber and the transmitting or receiving module.

2. Description of the Related Art

An optical connector having a sleeve between an optical fiber and a transmitting module and between an optical fiber and a receiving module is disclosed in Japanese Utility Model Registration Application Laid-open No. 6-33443.

The optical connector has a sleeve having a light-leading path with a constant diameter along an optical axis. Therefore, when a light-receiving surface of the receiving module is smaller than the light-emitting surface of the sleeve, a part of signal light transmitted through the optical fiber cannot be received by the receiving module, thereby lowering the transmission efficiency.

When a light emitting diode (LED) is used as a transmitting module, the light emitted by the light emitting diode diffuses, and a part of the light emitted by the light emitting diode cannot enter the light-leading path of the sleeve.

An optical connector, shown in FIG. 11, disclosed in Japanese Patent Application Laid-open No. 2000-304980 has a higher transmission efficiency of the signal light. The optical connector 102 in FIG. 11 has a receptacle 103 (an equipment-side connector) and a non-shown optical plug to couple the receptacle 103.

The receptacle 103 has a housing 107 of synthetic resin, transmitting and receiving modules 104 and a pair of sleeves 101. The housing 107 is formed in a box-shape and has a pair of accommodating chambers 108 opening in the external wall. And, the housing 107 couples with the optical plug shown in FIG. 11.

The transmitting and receiving modules 104 are accommodated in the respective chambers 108. A pair of sleeves 101 are installed in the housing 107. The sleeve 101 has a light-leading path 126 of frusto-conical shape.

One sleeve 101 is arranged between the optical fiber of the optical plug and the light-emitting surface the transmitting module 104, and the other sleeve 101 is arranged between the other optical fiber of the optical plug and the light-receiving surface of the receiving module 104 in the housing 107. The sleeve 101 is arranged in the housing 107 in a state that the light-leading path 126 reduces its diameter toward the transmitting or receiving module 104.

And, a cap 110 is attached to the housing 107 after accommodating the transmitting and receiving modules 104 in the chambers 108.

The optical plug has a pair of optical fibers, a pair of ferrules, and the plug housing. The pair of optical fibers are arranged in parallel. Each ferrule covers the optical fiber in a state of the end face of the optical fiber being exposed. The plug housing accommodates the ferrule and couples within the housing.

In the optical connector 102, the signal light from the optical fiber proceeds in the light-leading path 126 while making total reflections on the side portion 125 and gathering as approaching the receiving module 104.

On the other hand, when the signal light from the transmitting module 104 is transmitted through the sleeve 101, the light-leading path 126 with the tapered side surface can prevent the light from scattering, thereby improving the transmission efficiency.

With respect to the above prior art optical connector 102, however, since the sleeve 101 is accommodated in the housing 107 in a state that the light-leading path 126 reduces its diameter toward the transmitting or receiving module 104, it is difficult to secure the sleeve 101 in the housing 107 such that the sleeve 101 can optically connect the optical fibers and the respective transmitting and receiving modules 104.

The above structure requires increased man-hours for its assembly work thereby increasing the cost. And also, since the transmitting and receiving modules 104 can not necessarily be optically secured with the optical fibers, the transmission efficiency of the signal light is lowered. Further, the sleeve 101 slips off to an extent of releasing the optical connection.

In view of the foregoing, an object of the present invention is to provide a sleeve and a manufacturing method of the sleeve, wherein the transmission efficiency of the optical connector can be improved and the cost of the optical connector can be reduced with its easier assembly work.

SUMMARY OF THE INVENTION

In order to achieve the above object, as a first aspect of the present invention, a sleeve arranged between an optical fiber and a transmitting or receiving module for optically connecting the optical fiber and the transmitting or receiving module comprises: a light-leading path being in a frusto-conical shape having a small-diameter end face facing the transmitting or receiving module; a peripheral projecting portion projecting in a radial direction from another end portion, being on a side of the optical fiber, of the light-leading path; and an outer tube portion extending in an optical axis direction of the light-leading path from a peripheral portion of the peripheral projecting portion toward the small-diameter end face while covering an entire length of the light-leading path.

As a second aspect of the present invention, based on the first aspect, the peripheral projecting portion is circularly formed coaxially with the light-leading path, and the outer tube portion is cylindrically formed coaxially with the light-leading path.

As a third aspect of the present invention, based on the second aspect, an outside diameter of the outer tube portion is substantially uniform over an entire length of the light-leading path.

As a fourth aspect of the present invention, based on the first aspect, the outer tube portion has a flange projecting annularly in a radial direction from a peripheral surface thereof.

As a fifth aspect of the present invention, based on the first aspect, a lens is formed integrally with said another end portion of the light-leading path convexly toward the optical fiber.

As a sixth aspect of the present invention, based on the fifth aspect, the lens does not project over an optical fiber side end of the outer tube portion.

As a seventh aspect of the present invention, based on the first aspect, an end face of said another end portion of the light-leading path is a light-receiving surface to receive light transmitted by the optical fiber, and a diameter of the light-receiving surface is larger than a diameter of a light-emitting surface being an end face of the optical fiber.

As an eighth aspect of the present invention, based on the first aspect, the small-diameter end face of the light-leading path is a light-emitting surface to emit light transmitted to the receiving module, and a diameter of the light-emitting surface is smaller than a diameter of a light-receiving surface of the receiving module.

As a ninth aspect of the present invention, based on any one of the first to sixth aspects, the small-diameter end face of the light-leading path is a light-receiving surface to receive light transmitted from the transmitting module, and a diameter of the light-receiving surface is larger than a diameter of a light-emitting surface of the transmitting module.

As a tenth aspect of the present invention, a method of manufacturing a sleeve arranged between an optical fiber and a transmitting or receiving module for optically connecting the optical fiber and the transmitting or receiving module, wherein the sleeve comprises: a light-leading path being in a flat-headed conic shape having a small-diameter end face facing the transmitting or receiving module; a peripheral projecting portion projecting circularly in a radial direction from another end portion, being on a side of the optical fiber, of the light-leading path; and an outer tube portion extending in an optical axis direction of the light-leading path from a peripheral portion of the peripheral projecting portion toward the small-diameter end face while covering an entire length of the light-leading path, comprising the step of: setting a first metal mold having a first molding portion being along an external shape of said another end portion of the light-leading path of the sleeve and along an external shape of the outer tube portion and a second metal mold having a second molding portion made of hard material and being along an inner surface of the outer tube portion and along a peripheral surface of the light-leading path.

According to the above-described structures of the present invention, the following advantages are provided.

(1) Owing to the peripheral projecting portion and the outer tube portion, the optical connector can be assembled in a state that the sleeve is accommodated and positioned in the mediating pipe of the housing, thereby improving productivity of the optical connector with the sleeve and reducing the cost thereof by reducing man-hour for the assembly work and simplifying the manufacturing process. And, because the outer tube portion extends over the entire length of the light-leading path, the sleeve can be prevented from deflecting in the mediating pipe, thereby improving the transmission efficiency between the sleeve and the optical fiber, the sleeve and the transmitting device, and the sleeve and the receiving device; that is, improving the transmission efficiency of the optical connector with the sleeve.

(2) Because the outer tube portion is coaxially and cylindrically formed similarly to the light-leading path, the sleeve can be securely assembled to the mediating pipe only by accommodating the sleeve into the mediating pipe and can be prevented from deflecting in the mediating pipe, thereby improving productivity of the optical connector with the sleeve, reducing the cost thereof, and improving the transmission efficiency of the optical connector with the sleeve.

(3) Because the outside diameter of the outer tube portion is uniform in a longitudinal direction thereof, the sleeve can be more securely positioned only by accommodating it in the mediating pipe of the housing, thereby improving productivity of the optical connector with the sleeve, reducing the cost thereof, and improving the transmission efficiency of the optical connector with the sleeve.

(4) The flange portion projecting from the peripheral surface of the outer tube portion abuts an inside portion of the housing, the sleeve accommodated in the housing can be more securely positioned, thereby improving the transmission efficiency of the optical connector with the sleeve.

(5) Because an influence of an axial or radial deflection between the optical fiber and the sleeve can be reduced, The transmission efficiency can be improved.

(6) Because the lens does not project beyond the outer tube portion, the lens can be protected by the outer tube portion, thereby facilitating the production management.

(7) Because the diameter of the light-receiving surface of the light-leading path is larger than that of the light-emitting surface of the optical fiber, the light-receiving surface of the light-leading path can receive the light as much as possible, thereby further improving the transmission efficiency.

(8) Because the diameter of the light-emitting surface of the light-leading path is smaller than that of the light-receiving surface of the receiving module, the light-receiving surface of the receiving module can receive the light as much as possible, thereby further improving the transmission efficiency.

(9) Because the diameter of the light-receiving surface of the light-leading path is larger than the light-emitting surface of the transmitting module, the light-receiving surface of the light-leading path can receive the light as much as possible, thereby further improving the transmission efficiency.

(10) Because the second molding portion, formed relatively thin, along the inner surface of the outer tube portion of the second metal mold and the peripheral surface of the light-leading path is made of the hard material, the sleeve can be molded securely. And, owing to the outer tube portion, the optical connector can be assembled in a state that the sleeve is accommodated and positioned in the mediating pipe of the housing. And, because the outer tube portion extends over the entire length of the light-leading path, the sleeve can be prevented from deflecting in the mediating pipe. Therefore, the sleeve enabling the optical connector to reduce the cost and to improve the transmission efficiency can be obtained.

The above and other objects and features of the present invention will become more apparent from the following description taken in conjunction with the accompanying drawings.

BRIEF DESCRIPTION OF THE DRAWINGS

FIG. 4 is a sectional view of the sleeve, taken along a line IV—IV in FIG. 3;

FIG. 9 is a diagram showing a state of transmitting the light shown in FIG. 8, which light should be conventionally larger than the critical angle;

FIG. 10 is a sectional view showing a part of a metal mold unit used for molding the sleeve shown in FIG. 3; and FIG. 11 is an exploded perspective view showing a structure of a prior art optical connector.

DESCRIPTION OF THE PREFERRED EMBODIMENT(S)

An embodiment of the present invention will now be described in further detail with reference to the accompanying drawings. A sleeve 1 as an embodiment of the present invention shown, for example, in FIG. 3 is used in an optical connector 2 shown in FIG. 1 and FIG. 2.

Figure 1:
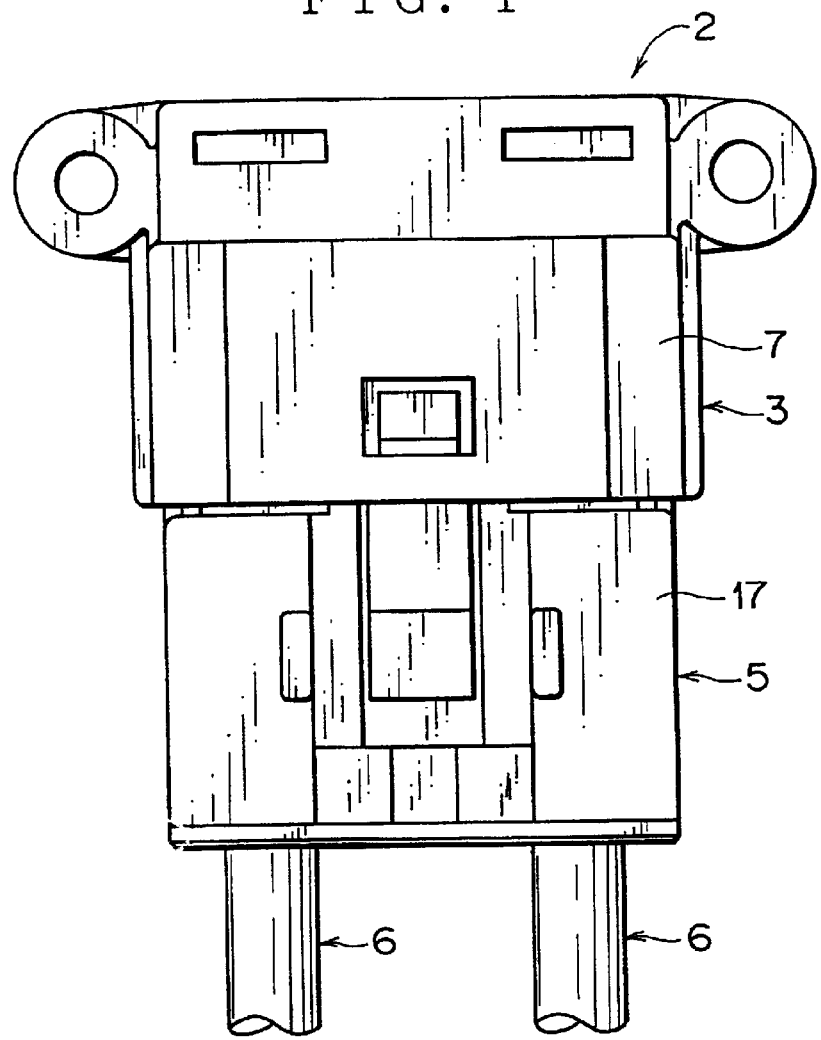
FIG. 1 is a plan view showing an optical connector having an embodiment of a sleeve in accordance with the present invention.
Figure 5:
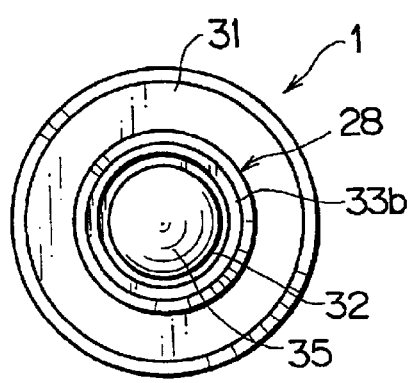
FIG. 5 is an end view of the sleeve, taken from an arrow V in FIG. 3.
Figure 6:
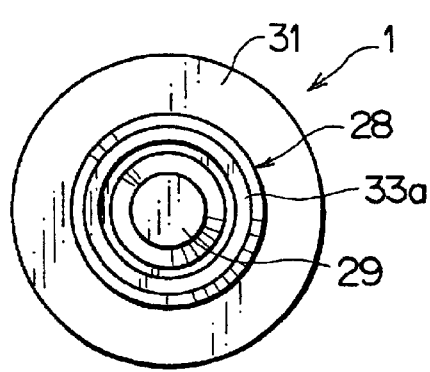
FIG. 6 is an end view of the sleeve, taken from an arrow VI in FIG. 3.
Figure 2:
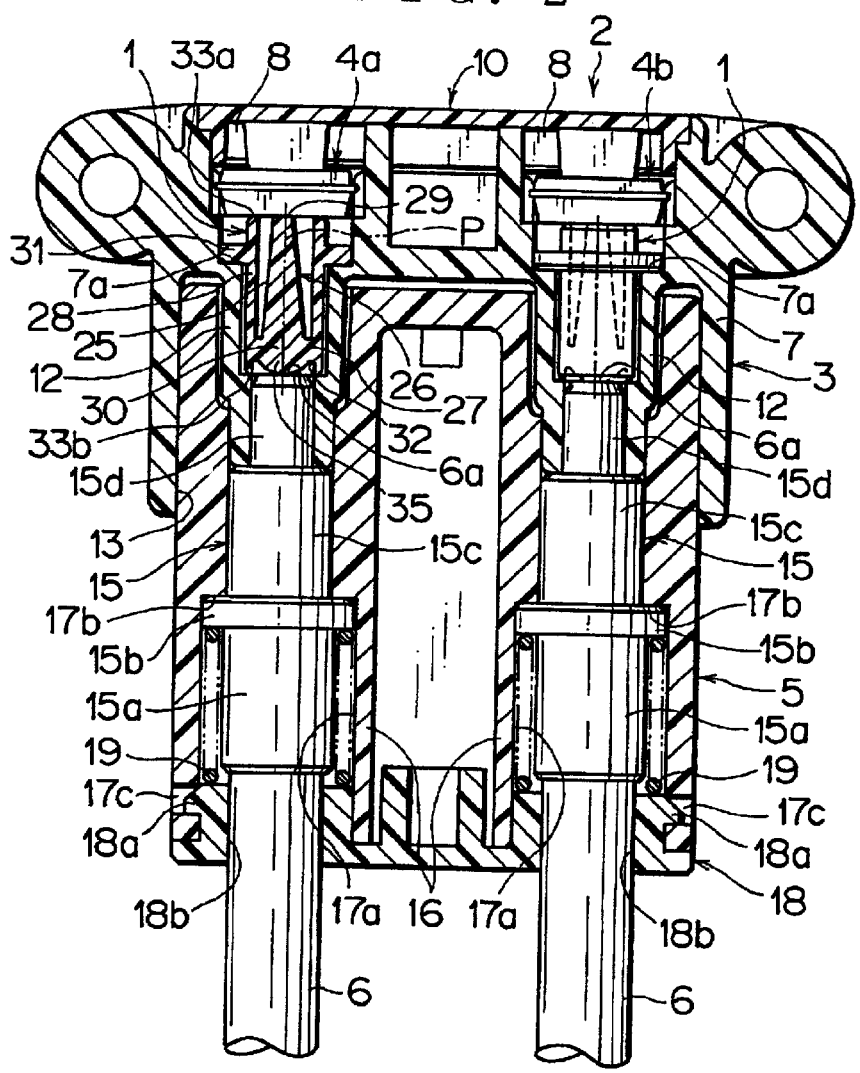
FIG. 2 is a sectional view of the optical connector shown in FIG. 1.
Figure 3:
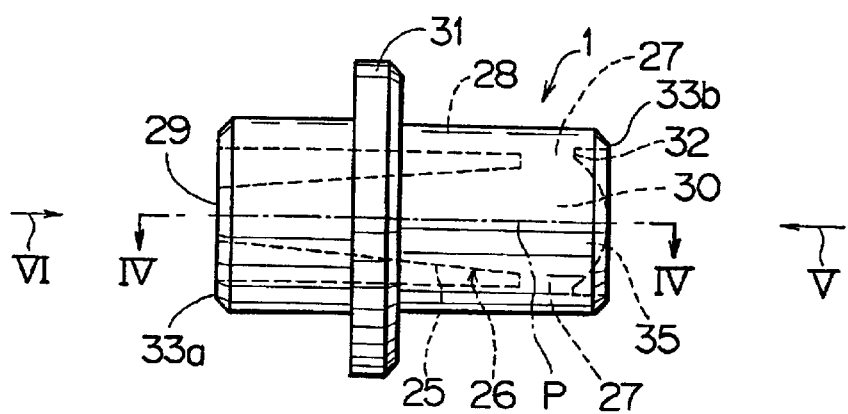
FIG. 3 is a side view showing an embodiment of the sleeve in accordance with the present invention.

The optical connector 2, as shown in FIG. 1 and FIG. 2, has a receptacle (an equipment-side connector) 3 and an optical plug (an optical fiber-side connector) 5. The optical plug 5 has a pair of optical fibers 6 arranged in parallel, a pair of ferrules 15, a plug housing 17, and a spring cap 18.

Figure 7:
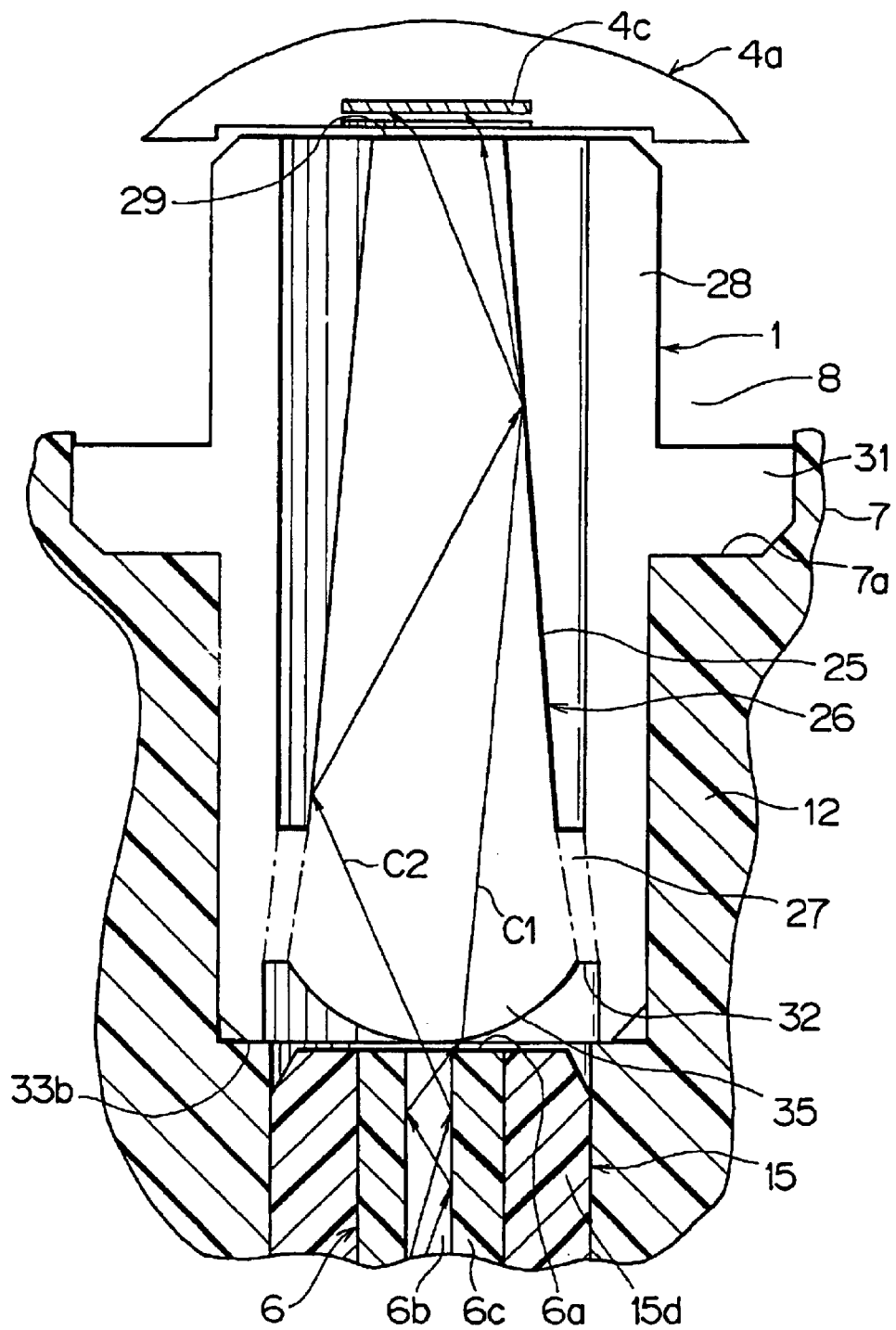
FIG. 7 is a sectional view showing a state of transmitting the light from an optical fiber to a receiving device through the sleeve shown in FIG. 3.
Figure 8:
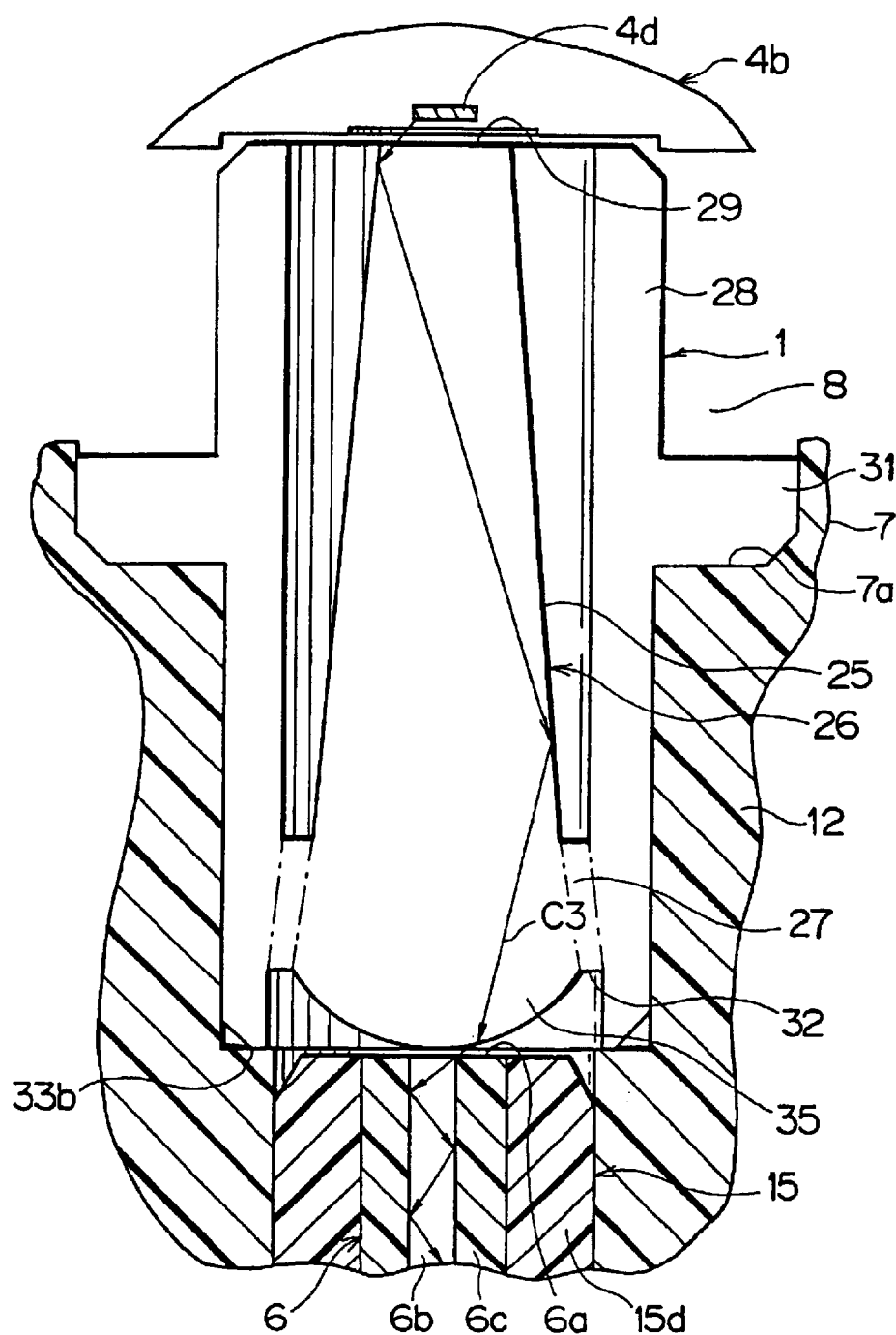
FIG. 8 is a sectional view showing a state of transmitting the light from a transmitting device to an optical fiber through the sleeve shown in FIG. 3.

Each optical fiber 6, as shown in FIG. 7 and FIG. 8, is a well-known step-type multimode plastic optical fiber having a core 6b and a clad 6c which have different index of refraction and are formed coaxially.

Each ferrule 15 is cylindrically formed with steppingly changing outside diameters. Each ferrule 15 is fixed with the optical fiber 6, while covering the optical fiber 6 in a state of the end face 6a of the optical fiber 6 being exposed.

The ferrule 15 integrally has a base end portion 15a most remote from the above end face 6a of the optical fiber 6, a circular ring portion 15b projecting in a radial direction from the base end portion's end nearer the end face 6a, a middle portion 15c continuing from a face of the circular ring portion 15b and having a diameter smaller than that of the above base end portion 15a, and a front end portion 15d continuing from the end of the middle portion 15c and having a diameter smaller than that of the middle portion 15c.

The base end portion 15a, the circular ring portion 15b, the middle portion 15c, and the front end portion 15d are arranged coaxially.

The plug housing 17 is formed of synthetic resin in a box-shape. The plug housing 17 has two accommodating chambers 17a therein, which accommodating chambers 17a each have end openings at the respective axial ends. These accommodating chambers 17a are partitioned off each other by a partition wall 16.

The ferrule 15 having the optical fiber 6 is inserted into each accommodating chamber 17a. And, the accommodating chamber 17a has a step portion 17b to abut the circular ring portion 15b when the ferrule 15 is accommodated.

And, the plug housing 17 has engaging holes 17c bored through the external wall. The engaging hole 17c is provided on the end portion of the plug housing 17 neat the base end portion of the ferrule 15.

The spring cap 18 is formed of synthetic resin generally tabularly. The spring cap 18 has a pair of optical fiber through-holes 18b and a plurality of engaging claws 18a on the peripheral portion. The engaging claw 18a engages the engaging hole 17c. The optical fiber 6 is put through the optical fiber through-hole 18b.

And, between the circular tube portion 15b and the spring cap 18, a coil spring 19 to energize the ferrule 15 toward the step portion 17b is provided on the ferrule 15. The coil spring 19 is arranged in a state of the base end portion 15a being put therethrough.

The above optical plug 5 is assembled as follows. The base end portion 15a of the ferrule 15 is put through the coil spring 19, and the coil spring 19 is abutted against the circular ring portion 15b. The optical fiber 6 is put through the optical fiber through-hole 18b of the spring cap 18.

And, the optical fiber 6 is secured to the ferrule 15. The ferrule 15 is insert into the accommodating chamber 17a. The spring cap 18 is attached to the plug housing 17, while engaging the engaging claws 18a to the respective engaging holes 17c.

The receptacle 3, as shown in FIG. 2, has a housing 7 of synthetic resin, a receiving device 4a (FIG. 7) as the receiving module, a transmitting device 4b (FIG. 8) as the transmitting module, and a pair of sleeves 1.

The housing 7 is formed in a box-shape. The housing 7 has a pair of accommodating chambers 8 (FIG. 2) opening in the external wall, a pair of mediating pipes 12 communicating with the respective accommodating chambers, and an opening portion 13 communicating with the mediating pipes 12 and the accommodating chambers 8.

The mediating pipes 12 formed cylindrically are arranged in parallel. The mediating pipes 12 are arranged in parallel with the respective optical axes of the transmitting and receiving devices 4a, 4b accommodated in the respective accommodating chamber 8.

Through the opening portion 13, the optical plug 5 couples with the receptacle 3. When the optical plug 5 couples with the receptacle 3, the end portion, of the mediating pipe 12, on the side of the opening portion 13 is arranged between the peripheral surface of the front end portion 15d of the ferrule 15 and the inner surface of the accommodating chamber 17a of the plug housing 17.

And, between the mediating pipe 12 and the accommodating chamber 8, a step portion 7a to abut a later-described the flange 31 of the sleeve 1 accommodated in the mediating pipe 12 is provided.

Further, a cap 10 is attached to the housing 7. The cap 10 covers the openings of the accommodating chambers 8, while covering the receiving device 4a and the transmitting device 4b accommodated in the accommodating chambers 8.

The receiving device 4a and the transmitting device 4b are accommodated in the respective accommodating chambers 8. The receiving device 4a has a light-receiving surface 4c (FIG. 7) to receiver the signal light and converts the received signal light into the electrical signal. The transmitting device 4b converts the electrical signal into the signal light and has a light-emitting surface 4d (FIG. 8) to emit the signal light.

The sleeve 1 is formed, for example, by the injection molding with synthetic resin such as Polymethylmethacrylate (PMMA), transparent polycarbonate (PC), or Cycloolefin. The sleeve 1, as shown in FIG. 3 to FIG. 6, integrally has a light-leading path 26 in a frusto-conical shape, a peripheral projecting portion 27, an outer tube portion 28, and a flange 31.

A small-diameter end face 29 of the light-leading path 26, as shown in FIG. 7 and FIG. 8, is smaller than the light-receiving surface 4c of the receiving device 4a and larger than the light-emitting surface 4d of the transmitting device 4b. The above end face 29 is arranged in a state of facing the light-receiving surface 4c or the light-emitting surface 4d so that the end face 29 can be optically connected with the transmitting device 4b or the receiving device 4a.

And, the light-leading path 26 is arranged in a state of an end face 32, on the side of the other end portion 30 with a larger diameter, facing the end face 6a of the optical fiber 6. That is, the end face 32 is optically connected with the optical fiber 6. The light-leading path 26 has a lens 35 integrally with the end face 32.

The lens 35 is formed convexly with a defined radius of curvature toward the optical fiber 6 from the end face 32. In the present embodiment, the lens 35 is a spherical one. This lens 35 attains an efficient transmission of the signal light. And, the lens 35 does not project beyond an end face 33b of the outer tube portion 28.

The peripheral projecting portion 27 projects from the peripheral surface of the other end portion 30 of the light-leading path 26 in a radial direction thereof. The peripheral projecting portion 27 is formed circularly around the optical axis P of the light-leading path 26.

The outer tube portion 28 extends from the peripheral portion of the peripheral projecting portion 27 toward the end face 29. The outer tube portion 28 covers the entire light-leading path 26 along the optical axis P. An end face 33a of the outer tube portion 28 is generally flush with the above end face 29. The outside diameter of the outer tube portion 28 is the same over the entire length thereof. The center line of the outer tube portion 28 aligns with the optical axis P. The light-leading path 26, the peripheral projecting portion 27, and the outer tube portion 28 are formed coaxially.

The flange 31 is circular and projects radially from the peripheral surface of the outer tube portion 28. The flange 31 is provided on a generally longitudinal center of the outer tube portion 28 coaxially around the optical axis P. The flange 31 is formed coaxially with the light-leading path 26, the peripheral projecting portion 27, and the outer tube portion 28.

The sleeve 1 is accommodated in the mediating pipe 12 such that the lens 35 abuts the end face 6a of the optical fiber 6, that is, such that a pair of end faces 29 abut the respective transmitting and receiving devices 4b, 4a. In this state, the above flanges 31 abut the step portions 7a.

The receptacle 3 with the above structure is assembled as follows. The sleeve 1 is inserted in the transferring tube 12 from the upper side (FIG. 2) thereof. Here, at this time, the lens 35 is inserted in the mediating pipe 12 such that the lens 35 is positioned on the side of the opening portion 13 and the end face 29 is positioned on the side of the accommodating chamber 8. And, the receiving device 4a and the transmitting device 4b are accommodated in the respective accommodating chambers 8. And then, the cap 10 is attached on the housing 7. In this state of the receptacle 3, the receptacle 3 and the optical plug 5 are coupled.

On the other hand, after the above coupling, the sleeve 1 abuts the step portion 7a in the receptacle 3 as shown in FIG. 2. And, a distance between the ferrules 15 and the respective receiving device 4a and the transmitting device 4b are kept in minimum so that a distance loss in the optical axis P direction can be the minimum.

Next, a state of transmitting the signal light from the optical fiber 6 to the receiving device 4a through the sleeve 1 with reference to FIG. 7. As shown by arrows, the lights C1,C2 having transmitted in the optical fiber 6 while repeating total reflection are emitted from the end face 6a (the light-emitting surface) of the optical fiber 6 and enter the sleeve 1 through the lens 35. Then, since the side portion 25 of the light-leading path 26 is tapered toward the receiving device 4a and further the side portion 25 is contacting with the air, the lights C1,C2 are gradually gathered, thereby entering the light-receiving surface 4c of the receiving device 4a without a loss.

On the other hand, a state of transmitting the light from the transmitting device 4b to the optical fiber 6 through the sleeve 1 is shown by an arrow in FIG. 8. That is, the light C3 emitted, for example, from a LED (also including the laser light) and then emitted from the light-emitting surface 4d of the transmitting device 4b enters the sleeve 1 through the end face 29 of the sleeve 1. And, similarly to the light C3, the LED light C3 arrives at the lens 35 due to the tapered side portion 25 of the light-leading path 26 and the contact with the air, while spreading total reflection. And, the LED light C3 is gathered by the lens 35 and enters the optical fiber 6 without a loss through the end face 6a (the light-receiving surface) of the optical fiber 6.

The sleeve 1 has the light-leading path 26 having the tapered side portion as shown in FIG. 8. In this case, the number of the total reflection of the LED light C3, in the light-leading path 26, having entered the light-leading path 26 through the end face 29 is smaller than that of the light, in the light-leading path 26, reaching the receiving device 4a show in FIG. 7. The smaller number of the total reflection in the light-leading path 26 could improve transmission speed of the light C3 in the sleeve 1.

That is, even if the LED light C3, which has an entering angle larger than the critical angle (θ) (FIG. 9) of a cylindrical light-leading path, enters the sleeve 1, the LED light C3 makes the total reflection due to the tapered side portion 25 of the light-leading path 26. Like this, a drop of the transmission efficiency of the signal light emitted from the transmitting device 4b can be prevented.

And, a metal mold unit 40 shown in FIG. 10 is used for the injection molding of the sleeve 1. The metal mold unit 40 has a first mold 41, a second mold 42, a third mold 43, a fourth mold 44, and a fifth mold 45.

The above molds 41-45 can be assembled and disassembled and can form a cavity 46 for the sleeve 1 as shown in FIG. 10. And, the molded sleeve 1 can be taken out of the cavity 46 by disassembling the molds.

The first mold 41 has a molding portion 41a along external forms of the above end face 32 and the lens 35. The second mold 42 and the fourth mold 44 cooperate to form molding portions 42a,44a along an external form of the outer tube portion 28. And, the second mold 42 has a gate 47 to supply the melted synthetic resin into the above cavity 46.

Here, the above first mold 41, the second mold 42, and the fourth mold 43 constitute the first metal mold. The above molding portions 41a,42a, 44a constitute a first molding portion along external forms of the outer tube portion 28 and the other end portion 30 of the sleeve 1.

The third mold 43 has a molding portion 43a as a second molding portion along the inner surface of the outer tube portion 28, the peripheral surface of the light-leading path 26, and the surface of the peripheral projecting portion 27. The molding portion 43a is made of a hard material such as the SKH steel or the super steel.

Here, the SKH steel is a highspeed tool steel standardized by JIS (Japanese Industrial Standard) G4403, and the super steel is, for example, the SKS steel standardized by JIS G4404. The fifth mold 45 is cylindrically formed, which outside diameter is almost the same as the inside diameter of the third mold 43, and has a molding portion 45a along the above end face 29. Here, the third mold 43 and the fifth mold 45 constitute the second metal mold.

According to the present embodiment, as describe with referring to FIG. 1 to FIG. 9, since the sleeve 1 has the light-leading path 26 and the lens 35, the transmission efficiency of the signal light can be improved.

Owing to the peripheral projecting portion 27 and the outer tube portion 28, the optical connector 2 can be assembled in a state that the sleeve 1 is accommodated and positioned in the mediating pipe 12 of the housing 7, thereby improving productivity of the optical connector 2 with the sleeve 1 and reducing the cost thereof by reducing man-hour for the assembly work and simplifying the manufacturing process.

And, because the outer tube portion 28 extends over the entire length of the light-leading path 26, the sleeve 1 can be prevented from deflecting in the mediating pipe 12, thereby improving the transmission efficiency between the sleeve 1 and the optical fiber 6, the sleeve 1 and the transmitting device 4b, and the sleeve 1 and the receiving device 4a; that is, improving the transmission efficiency of the optical connector 2 with the sleeve 1.

Further, because the sleeve 1 is integrally formed of a transmissible synthetic resin material, the productivity thereof can be improved. And, because the molding portion 43a of the third mold 43 is made of the hard material, the sleeve 1 with the above structure can be molded securely.

And, because an optical connection efficiency can be easily calculated by using an optics calculation software for the structure of the sleeve 1 with the light-leading path 26, the lens 35 and the like, dimensions optimizing the optical connection efficiency can be easily obtained.

In the present embodiment, though the optical fiber 6 is of a step type, an optical fiber of a gray dead type may be used. And, the lens 35 may be an aspherical lens having a plurality of radii of curvature.

Further, although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A sleeve for arrangement in a connector between an optical fiber and a transmitting or receiving module for optically connecting the optical fiber and the transmitting or receiving module, said sleeve comprising:

a body containing a portion defining a light-leading path of frusto-conical shape having a side portion, and a small-diameter end face for facing the transmitting or receiving module;

an outer tube portion concentrically spaced with respect to the light-leading path and being substantially coextensive therewith; and an integrally formed peripheral projecting portion of said sleeve extending radially from said side portion of the light-leading path and interconnecting the outer tube portion and the side portion of the light-leading path thereof.

2. The sleeve as set forth in claim 1, wherein the peripheral projecting portion is circularly formed coaxially with the light-leading path, and the outer tube portion is cylindrically formed coaxially with the light-leading path.

3. The sleeve as set forth in claim 2, wherein an outside diameter of the outer tube portion is substantially uniform over an entire length of the light-leading path.

4. The sleeve as set forth in claim 1, wherein the outer tube portion has a flange projecting annularly in a radial direction from a peripheral surface thereof.

5. The sleeve as set forth in claim 1, including a convex lens formed integrally with said light-leading path for extending toward the optical fiber.

6. The sleeve as set forth in claim 5, wherein the lens has an axial length not greater than an optical fiber side end of the outer tube portion.

7. The sleeve as set forth in claim 1, wherein an end face of said light-leading path opposite said small diameter end face is a light-receiving surface for receiving light transmitted by an optical fiber, and a diameter of the light-receiving surface is larger than a diameter of a light-emitting surface at an end face of an optical fiber.

8. The sleeve as set forth in claim 1, wherein the small-diameter end face of the light-leading path is a light-emitting surface to emit light transmitted to a receiving module, and a diameter of the light-emitting surface is smaller than a diameter of a light-receiving surface of the receiving module.

9. The sleeve as set forth in any one of claims 1–6, wherein the small-diameter end face of the light-leading path is a light-receiving surface for receiving light transmitted from a transmitting module, and a diameter of the light-receiving surface is larger than a diameter of a light-emitting surface to the transmitting module.

* * * * *